UNITED STATES PATENT OFFICE.

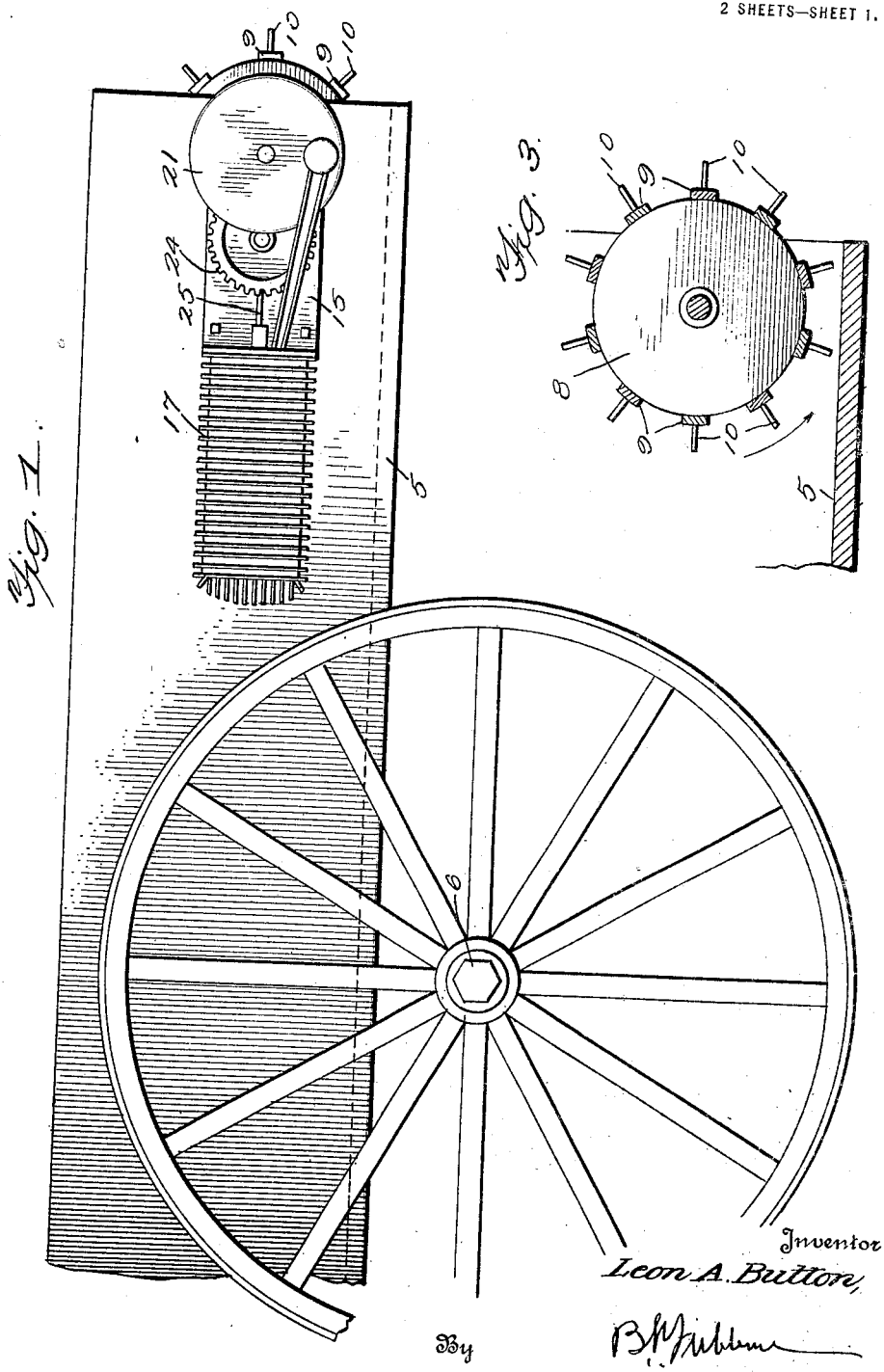
L. A. BUTTON.
FERTILIZER OR MANURE DISTRIBUTER.
APPLICATION FILED MAR. 29, 1920.
1,377,664.
Patented May 10, 1921.
2 SHEETS—SHEET 1.
Inventor
Leon A. Button,
By
Attorney

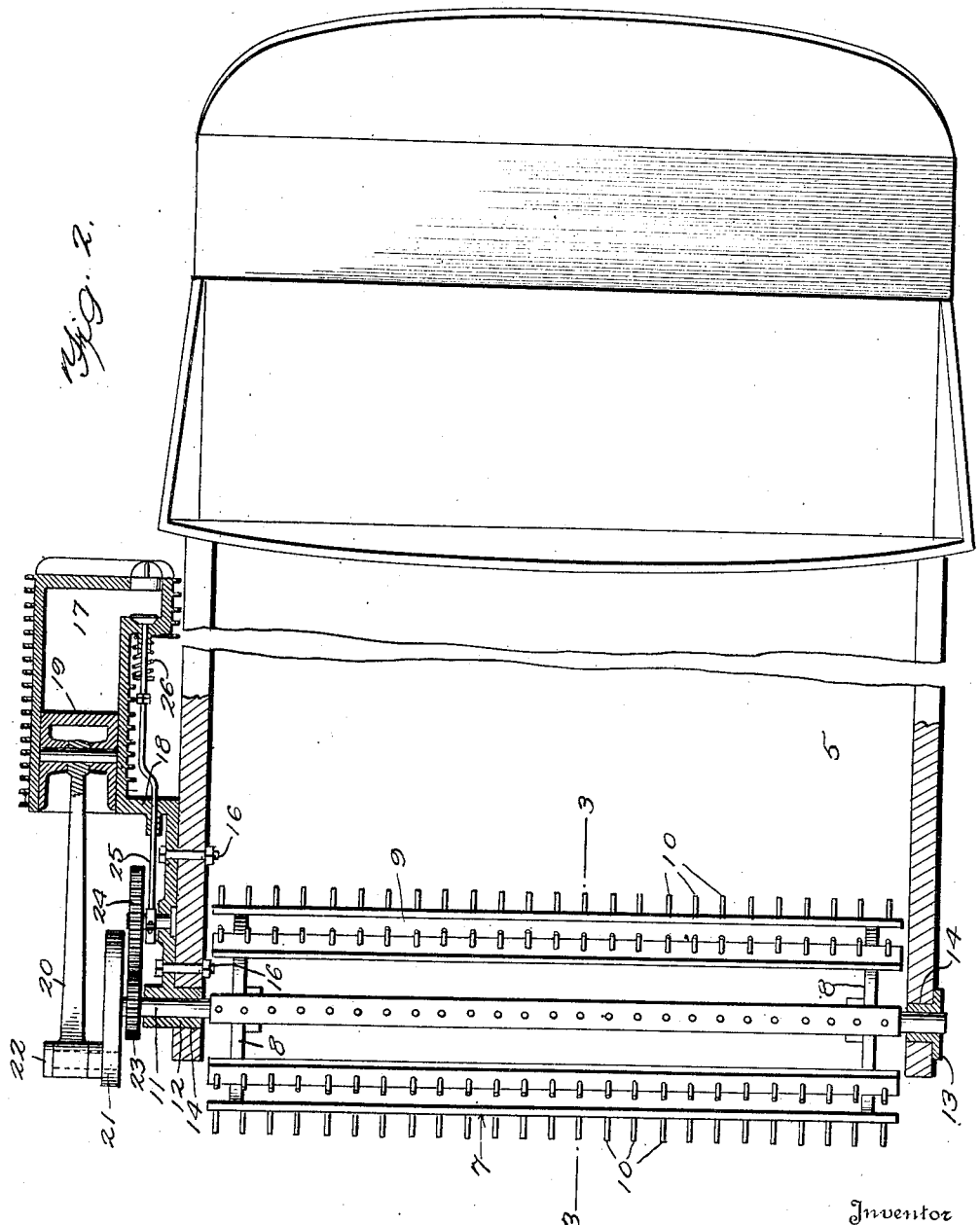

LEON A. BUTTON, OF NEW BERLIN, NEW YORK.

FERTILIZER OR MANURE DISTRIBUTER.

1,377,664.  Specification of Letters Patent.  Patented May 10, 1921.

Application filed March 29, 1920. Serial No. 369,536.

*To all whom it may concern:*

Be it known that I, LEON A. BUTTON, a citizen of the United States, residing at New Berlin, in the county of Chenango and State of New York, have invented certain new and useful Improvements in Fertilizer or Manure Distributers, of which the following is a specification.

My invention relates to improvements in fertilizer or manure spreaders.

An important object of the invention is to provide means whereby the rotatable drum of the device may be directly connected with the motor or engine driving the same, thereby providing a simple and cheap construction.

A further object of the invention is to provide means whereby the motor or engine may be secured to the side of the body of the device, with a shaft extending transversely of the body, and common to the motor and the rotatable drum.

Other objects and advantages of the invention will be apparent during the course of the following description.

In the accompanying drawings forming a part of this specification, and in which like numerals are employed to designate like parts throughout the same, Figure 1 is a side elevation of apparatus embodying my invention, parts broken away, Fig. 2 is a plan view of the same, parts broken away, and parts in section, and, Fig. 3 is a transverse section taken on line 3—3 of Fig. 2.

In the drawings, wherein for the purpose of illustration is shown a preferred embodiment of my invention, the numeral 5 designates a body, such as the ordinary wagon body, for holding the fertilizer or manure. The rear portion of this body may be supported by wheels 6, the forward portion being also supported by wheels, not shown.

The numeral 7 designates a preferably horizontally arranged spreader drum, preferably embodying heads or disks 8, carrying spaced longitudinal bars 9, having radial outwardly projecting fingers or pins 10. The drum is arranged within the rear open end of the body 5, and extends transversely thereof, the drum being suitably spaced from the bottom of the body so that the fingers 10 will clear such bottom. The drum is preferably rotated in the direction of the arrow, Fig. 3, and will pick up the material and discharge it rearwardly under the drum. However, the invention is in no sense restricted to rotating the drum in this direction, as it may be rotated in an opposite direction, if desired.

The numeral 11 designates a common horizontal shaft, extending transversely of the body 5, at its rear end, and having the heads or disks 8 directly and rigidly mounted thereon. This shaft is journaled in bearings 12 and 13, held within openings 14. The bearing 12 is preferably cast integral with a crank case member 15. This crank case member may be in the form of a flat plate, rigidly secured to the side of the body by bolts 16, serving to directly strap the same to the side.

The crank case member 15 has a cylinder 17 of an internal combustion engine, rigidly secured thereto and preferably integral therewith. This cylinder is preferably horizontally arranged, and disposed in end to end relation with the member 15, there being a laterally extending connecting portion 18, between the member and the cylinder.

Mounted to reciprocate within the cylinder 17 is a piston 19, having pivotal connection with a pitman or connecting rod 20, pivoted to a crank disk 21, by a crank pin 22. The crank disk 21 is directly and rigidly mounted upon the common shaft 11.

A gear 23 may be rigidly mounted upon the shaft 11, for driving a gear 24 which operates a cam rod 25. This cam rod may operate the valve or valves of the engine. Any other suitable means may be employed to operate the valve or valves of the engine, if it is of the four cycle type, it being obvious that the valve gear would be dispensed with if a two cycle engine were employed.

In operation, the engine preferably rotates the drum in the direction of the arrow, shown in Fig. 3. The fertilizer or manure may be shoveled or otherwise fed to the drum, which picks it up and rotates it under the drum and discharging the same upon the ground. The drum also serves as a fly wheel for the engine, and the shaft 11 is common to the engine crank element or disk 21 and the drum.

It is to be understood that the form of my invention herewith shown and described is to be taken as a preferred example of the same, and that various changes in the shape, size and arrangement of parts may be resorted to without departing from the spirit of my invention, or the scope of the subjoined claims

Having thus described my invention, I claim:—

1. A fertilizer or manure spreader comprising, a body, a common shaft extending transversely of the body, a spreader drum carried by the common shaft, a crank element carried by the common shaft, a cylinder secured to the body, a piston within the cylinder, and a pitman connecting the piston and the crank element.

2. A fertilizer or manure spreader comprising, a body, a common shaft extending transversely of the body, a toothed drum disposed directly upon the shaft, a crank element connected directly with the common shaft, a cylinder arranged near the drum, a piston within the cylinder, and a pitman connected with the crank element and with the piston.

3. In a fertilizer or manure spreader, a body, a shaft extending transversely of the body, a cylinder having a crank case portion provided with a bearing for the shaft, means to secure the crank case portion to the body, a crank element connected with the shaft, a piston within the cylinder, a pitman connecting the piston and crank element, and a spreader drum carried by the shaft.

4. In a fertilizer or manure spreader, a body, a substantially horizontal cylinder arranged near the side of the body, a crank case member rigidly secured to the cylinder and having a bearing, means to secure said member to the side of the body, a shaft extending transversely of the body and having one portion thereof journaled in the bearing, a crank disk secured to one end of the shaft, a piston within the cylinder, a pitman connected with the crank disk and with the piston, and a toothed spreader drum connected with the shaft.

5. In a fertilizer or manure spreader, a wheeled body having a bottom and upstanding sides and its top open, bearings carried by the sides near their rear ends, a substantially horizontal transverse shaft journaled in the bearings, a spreader drum mounted upon the shaft, an internal combustion engine cylinder arranged upon the exterior of one side and extending longitudinally thereof, a crank case member rigidly secured to the cylinder and rigidly secured to the side for attaching the cylinder to the side whereby the vibrations from the engine are transmitted to said body in the direction longitudinally thereof, a piston mounted to reciprocate within the cylinder, a crank element directly mounted upon one end of the transverse shaft, and a pitman connected with the cylinder and directly pivoted upon the crank element.

6. In a fertilizer or manure spreader, a wheeled body having a bottom and upstanding sides and its top open, a substantially horizontally arranged internal combustion engine cylinder disposed outwardly of one of the sides, and having a substantially flat plate formed integral therewith, and provided with transverse openings, said plate being provided at its rear end with a bearing, attaching elements passing through said openings and engaging said side, a second bearing carried by the other side, a substantially horizontal transverse shaft extending through the body and held within the bearings, a spreader drum mounted upon the shaft, a crank element carried by one end of the shaft, a piston within the cylinder, and a pitman connected with the piston and directly connected with the crank element.

7. The combination with a horizontal receptacle, having upstanding sides, of an internal combustion engine cylinder arranged near the outer face of one side and having a flat plate rigidly secured thereto and directly carrying a bearing, means to clamp the plate to the side, a second bearing secured to the other side of the receptacle, a transverse shaft extending through the bearings, a rotatable element carried by the shaft, a crank element rigidly mounted upon one end of the shaft, a pitman directly connected with the crank element, and a piston within the cylinder connected with the pitman.

8. The combination with a horizontal receptacle having upstanding sides, of an internal combustion engine arranged near the outer face of one side, and having a flat plate formed integral therewith and a bearing integral with the end of the plate, said bearing extending laterally inwardly with relation to the plate and projecting into a transverse opening formed in the side, means to clamp the plate to said side, a second bearing carried by the opposite side, a transverse shaft journaled through the bearings, a rotatable element carried by the shaft, a crank element rigidly secured to one end of the shaft, a pitman directly connected with the crank element, and a piston within the cylinder connected with the pitman.

In testimony whereof I affix my signature in presence of two witnesses.

LEON A. BUTTON.

Witnesses:
CHARLES G. DOOLITTLE,
EMMA F. ACKERMAN.